United States Patent

[11] 3,563,567

[72] Inventor Charles E. Harp
 2110 Harper St., Pasadena, Calif. 77502
[21] Appl. No. 828,306
[22] Filed May 27, 1969
[45] Patented Feb. 16, 1971

[54] LANDING GEAR FOR SEMITRAILERS AND THE LIKE
 4 Claims, 6 Drawing Figs.
[52] U.S. Cl................................................. 280/150.5;
 248/166; 280/475
[51] Int. Cl................................................ B60s 9/04
[50] Field of Search........................................ 280/150.5,
 150 (C), 475; 248/166, 439, 440, 352

[56] References Cited
UNITED STATES PATENTS

| | | | |
|---|---|---|---|
| 2,863,670 | 12/1958 | Larson .......................... | 280/150.5 |
| 3,028,176 | 4/1962 | Raidel ........................... | 280/150.5 |
| 3,292,802 | 12/1966 | Hutchinson ................... | 280/150.5X |

FOREIGN PATENTS

| | | | |
|---|---|---|---|
| 216,612 | 12/1941 | Switzerland.................. | 280/150.5 |

*Primary Examiner*—Benjamin Hersh
*Assistant Examiner*—Leslie J. Paperner
*Attorney*—R. Werlin

ABSTRACT: Landing gear for supporting the forward end of a semitrailer and the like, after the prime mover or tractor has been removed.

Charles E. Harp
INVENTOR.

BY

ATTORNEY

Charles E. Harp
INVENTOR.

BY
ATTORNEY

LANDING GEAR FOR SEMITRAILERS AND THE LIKE

In semitrailers, floats, and the like, which are normally two-wheeled vehicles, the forward end of which is adapted to be connected to a prime mover or tractor by which the trailing vehicle is propelled on the highways, land gear is required to support the forward end of the semitrailer when it has been disconnected form its tractor or other prime mover. The most common form of landing gear comprises a pair of posts or legs rigidly secured to the opposite sides of the trailer and extending vertically downwardly to a point a short distance above the ground level. The legs are usually fitted with foot members which are retractably disposed in the lower ends of the legs to be moved either hydraulically or mechanically to extend and retract. When ground support is required, the foot members will be extended to engage the ground whereupon the tractor can be disconnected from the trailing vehicle and withdrawn. When the trailer is reconnected to the tractor the foot members are retracted to a degree necessary to afford road clearance for the lower ends of the leg members and the vehicle is ready to travel. This type of conventional landing gear is subject to numerous difficulties because of the limited road clearance. Large obstructions or even substantial irregularities in the road surface which may be encountered may be struck by the depending leg members causing them to be severely damaged or even broken. Also it is not uncommon that the operator fails to retract the foot members of the landing gear, with the result that they drag the ground and, of course, will strike any obstacles of even low height which may be encountered by the vehicle, with resulting damage to the landing gear.

Other types of landing gear which have been designed and used in some cases are of the swinging type, being pivotally secured in one manner or another to the underframe of the trailer to be swung upwardly out of ground-contacting position to free the trailer for movement and to be then swung back down into ground-supporting position to free the tractor for disconnection from the trailer. These known swinging types of landing gear, however, involve rather complex structural and operating mechanisms and are frequently subject to mechanical failures as well as to damage because of the failure on the part of the operator to retract them before moving the vehicle.

The present invention is directed to an improved form of landing gear which is of very simple construction, easily operated, and which avoids the difficulties encountered with more conventional landing gear designs.

In accordance with a preferred embodiment of this invention, the landing gear comprises a pair of leg or support members which are of a generally triangular shape mounted on opposite sides of the underframe of the trailer near its forward end. Each of the triangular leg members is defined by a pair of side legs, namely, a forward side leg and a rear side leg which are pivotally connected together at one end to form the apex of the triangle, this apex being likewise pivotally connected to a bracket secured to the underside of the trailer frame. The base member of the triangular support is formed from two sections, the outer ends of the sections being pivotally connected, respectively, to the base ends of the forward and rear leg members. The inner ends of the two sections of the base member are pivotally connected together at an intermediate point by means of a suitable pivot pin, so that the base member may be folded inwardly in retracting the support members upwardly beneath the frame. A cross bar extends transversely between the forward sections of the base member connecting the two triangular support members and a winchline is connected to this crossmember for purposes of retracting and lowering the support members in unison.

By means of the described construction the landing gear provides strong ground-engaging support for both sides of the trailer frame when the gear is in its lowered position at which the base and its end connections to the forward and rear side legs of the triangular structure are in full ground-engaging contact. When an upward and rearward pull is applied to the winchline, the base member, by reason of its articulated form, folds inwardly about its pivot, at the same time pulling the side legs of the triangular structure toward each other in the upward and rearward direction. The several pivoted connections between the ends of the side legs and the base member, as well as between the upper ends of the legs and the bracket carried by the trailer, permits this folding of the triangular support members into a relatively compact form which will be well elevated above the ground level and, if desired, may be nested inside a suitable compartment in the trailer frame.

The preferred structure, as described above, also lends itself readily to rearward folding in response to an impact against the forward side legs, should the operator, for example, fail to raise the landing gear before starting to move the trailer. This provides an important safety feature in the structure contemplated herein.

Other and more specific objects and advantages of this invention will become more readily apparent from the following detailed description when read in conjunction with the accompanying drawing which illustrates the preferred embodiment in accordance with this invention, as well as an alternative form of landing gear which employs some of the same principles embodied in the preferred embodiment.

Figure 1:
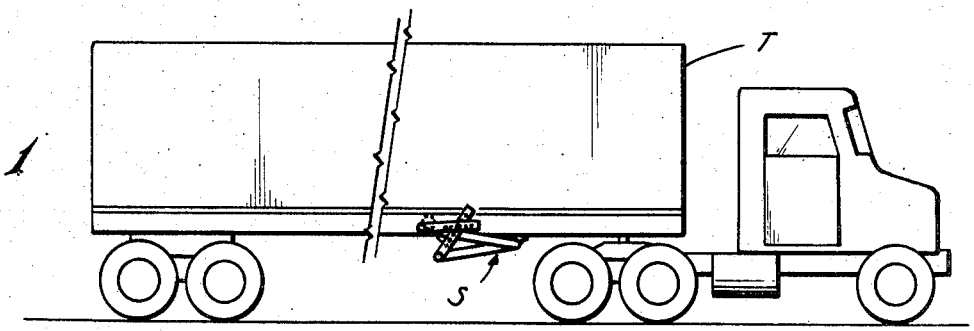
FIG. 1 is a side elevational view of a conventional tractor semitrailer combination showing the landing gear of the preferred embodiment in its collapsed or folded position.
Figure 2:
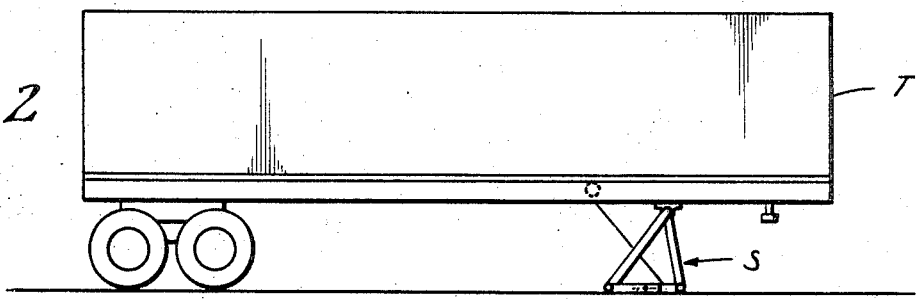
FIG. 2 is a side elevational view of the semitrailer showing the landing gear in its extended load-supporting position with the tractor removed from the semitrailer.

Referring to the drawing, the landing gear comprises a pair of generally triangular support members, designated generally by the letter S, one located on each side of the semitrailer frame near its forward end. Since the support members are identical, the description of one will apply to the other.

Figure 4:
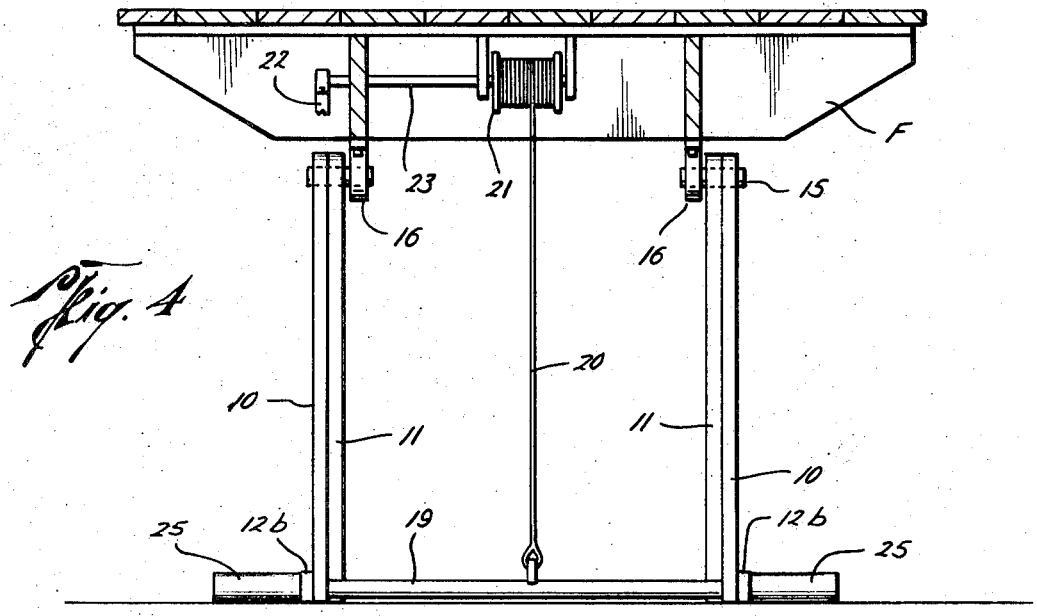
FIG. 4 is an elevational view taken on line 4—4 of FIG. 3 looking forwardly from the rear of the landing gear toward its forward end.
Figure 5:
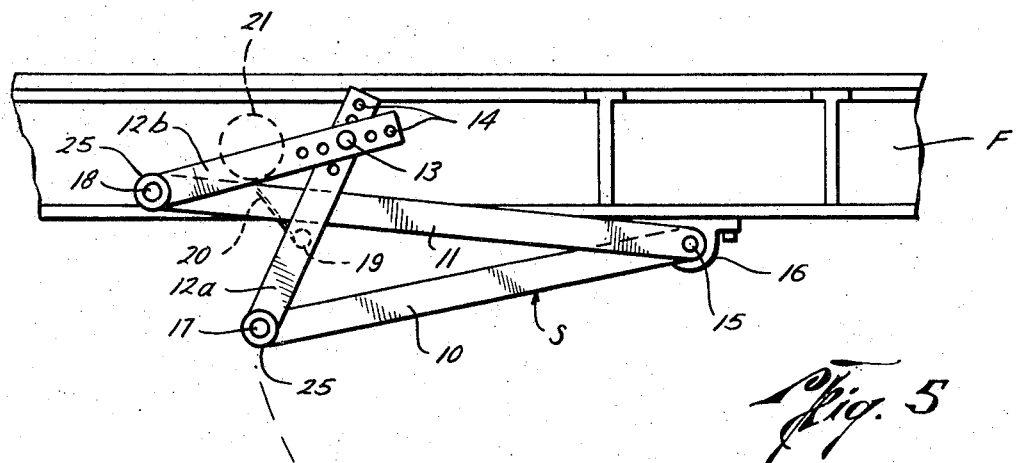
FIG. 5 is a side view of the landing gear in folded position.
Figure 6:
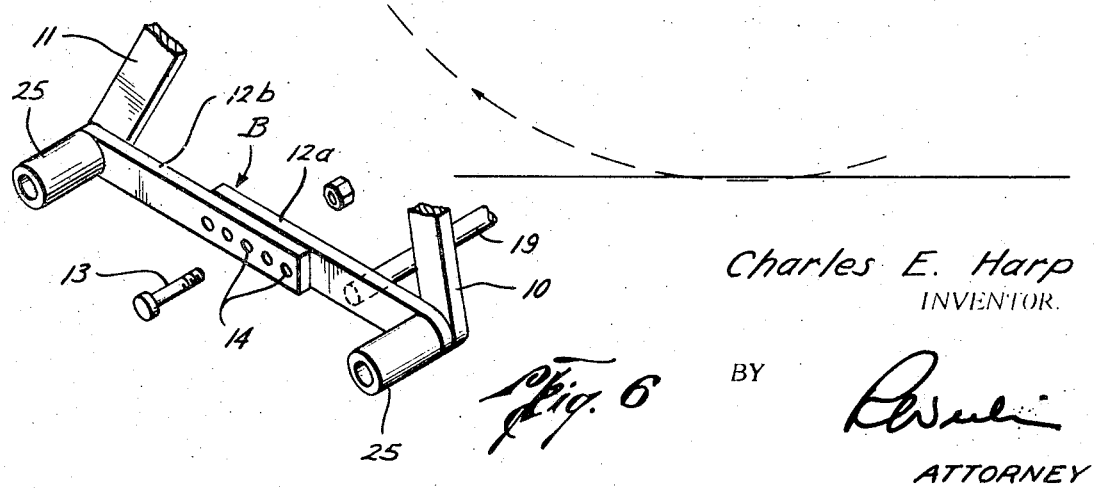
FIG. 6 is an exploded view, in perspective, showing the base member of the landing gear and its several parts.

Each of the support members comprises a forward side leg 10, a rear side leg 11, and a base member 12, of articulated construction, consisting of two pieces 12a and 12b pivotally connected together adjacent the center of the base by means of a pivoted connection, comprising a bolt 13 extending through matching holes 14 in the overlapping ends of pieces 12a and 12b. Legs 10 and 11 are pivotally connected at their upper ends to form the apex of the triangular support by means of a pivot pin 15 which extends transversely through the ends of the legs and is journaled in a bracket 16 supported beneath the bottom of the trailer frame F, the trailer being designated by the letter T. The lower end of forward leg 10 is pivotally connected by means of a pivot pin 17 to the forward end of section 12a of the base. Similarly, the lower end of rear leg 11 is pivotally connected by means of pivot pin 18 to the rearward end of rear section 12b. A crossbar 19 extends transversely between forward sections 12a of the two base members on the opposite sides of the trailer frame, as best seen in FIG. 4, this crossbar being located in front of the pivot point formed by pivot 13 between sections 12a and 12b of the base member. A cable 20 is connected to a crossbar 19 and wound around a winch 21 supported beneath the trailer and operated by means of a handle 22 connected to the winch shaft 23. When tension is applied to cable 20, an upward and rearward pull will be applied to the base member which will pull the base member inwardly, the sections of which will fold about the pivot pin 13 and collapse the base member inwardly. At the same time, forward leg 10 of the structure will move rearwardly and upwardly as the pull of cable 20 continues to be applied to the structure, pivoting at both ends about pivots 15 and 17. Rear leg 11 will likewise move upwardly pivoting at both ends about pivot pins 15 and 18. Finally, the entire support member will be collapsed and swung upwardly to a position just beneath the trailer floor, as best seen in FIG. 5, at which point the winch can be blocked in the position holding the support members in the retracted position shown.

Tubular extensions 25-25 may be mounted to the forward and rearward corners of the base member to extend laterally therefrom and provide an enlarged ground-support bearing for the structure.

Although the triangle formed by legs 10 and 11 at base B may be an isosceles triangle or an equilateral triangle, it is generally preferable that the support members have the configuration of an oblique triangle in that legs 10 and 11 be of unequal length with forward leg 10 being shorter than rearward leg 11, and that both base angles be acute angles. This will enable the support members to be retracted without having to raise the forward end of the trailer to any large degree, which would otherwise be the case if the legs were of the same length and at equal angles to the base. Base sections 12a and 12b will have overlapping portions which, as illustrated, may be provided with a series of longitudinally spaced openings 14, so that the length of base B may be adjusted to accommodate greater or lesser vertical spacing between the forward end of the trailer and the ground. If a greater height is required between the trailer and the ground in one location, the sections of base B may be retracted together and the pivot pin inserted in appropriate openings, so as to shorten the base member. If a lesser height is required, the base sections may be extended and secured in the pivoted relation in their extended positions. By providing a suitable series of openings in the base members, a considerable degree of adjustability will be available to accommodate various conditions encountered in the use of the landing gear.

Figure 3:
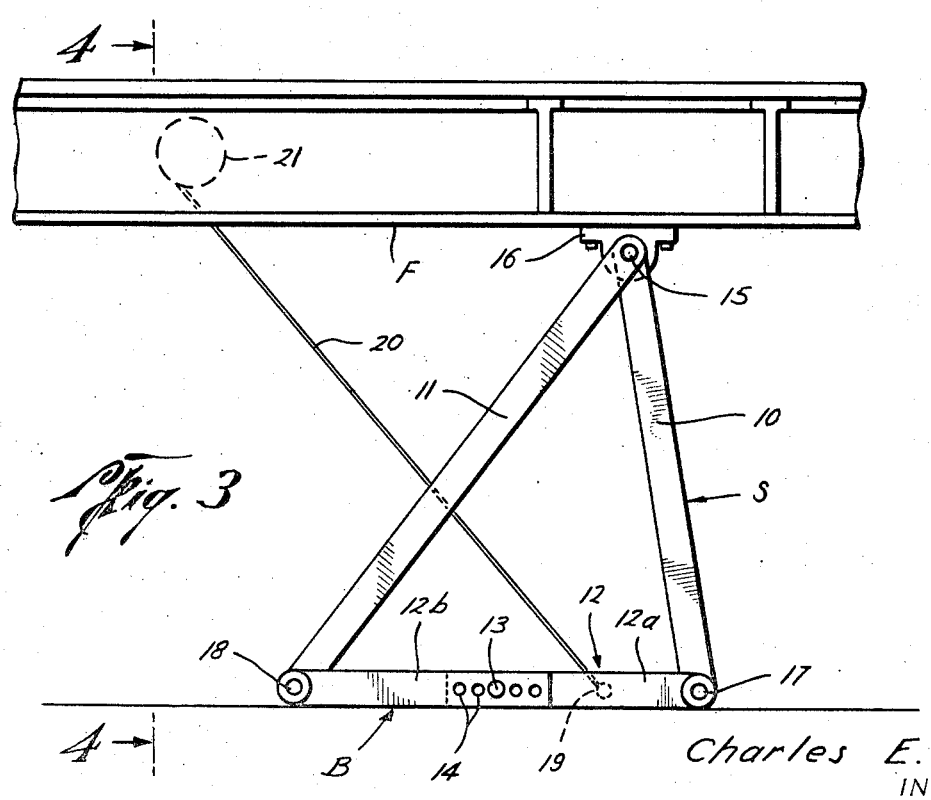
FIG. 3 is a side elevational view of one of the triangular landing gear elements shown in extended load-supporting position.

When the support members of the landing gear are to be actuated, the winch may be rotated in a direction to allow the landing gear to swing downwardly to the ground-engaging position. The weight of the members will generally be sufficient to cause them to unfold and to carry them to the lowered position and upon contact of the forward leg with the ground the base member will assume its fully extended ground-engaging position. When in the support position shown in FIG. 3, a three-point support is provided beneath the forward end of the trailer which will assure maximum load-supporting capacity and stability for the structure, particularly since the apex of the triangle is located between the ends of the base.

It will be understood that various changes and modifications may be made in the details of the illustrative embodiment without departing from the spirit of this invention.

I claim:
1. Landing gear for semitrailers and the like having an underframe, comprising:
   a. a pair of parallel, spaced apart generally triangular support members;
   b. each support member comprising a forward leg, a rear leg and a base member;
   c. said legs having one end pivotally connected to each other and to said underframe and having their opposite ends pivotally connected to the opposite ends of said base member;
   d. said base member comprising a pair of sections;
   e. pivot means forming an articulating connection between the sections at a point intermediate the ends of the base member;
   f. a crossbar extending transversely between the sections of the base member forwardly of said pivot means; and
   g. means mounted to said underframe and connected to said crossbar for swinging said support members rearwardly and upwardly toward said underframe while collapsing said base members inwardly about said pivot means whereby to move said legs toward each other so as to fold said support members to a ground-clearing position.
2. Landing gear according to claim 1, wherein the configuration of said support members is that of an oblique triangle in which said forward leg is shorter than said rear leg.
3. Landing gear according to claim 1, wherein said base member is adjustable in length.
4. Landing gear according to claim 1 having ground-engaging foot members extending laterally outwardly from the ends of said base member.